DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 706

T888,011
RECEIVING SHEET FOR PHOTOGRAPHIC DIFFUSION TRANSFER PROCESS

Robert E. Stauffer, % Kodak Park Works, Rochester, N.Y. 14650

Filed Nov. 19, 1970, Ser. No. 91,044
**Int. Cl. G03c *1/48***
U.S. Cl. 96—76
1 Sheet Drawing. 15 Pages Specification

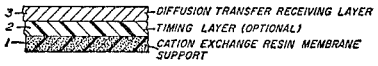

A receiving sheet for diffusion transfer processes wherein the print receiving element comprises a cation exchange membrane support. The cation exchange resin reduces the alkalinity of residual processing composition retained on the print thus reducing developer stain, dye discoloration, and the like. The support may also include an inert layer interposed between the print receiving layer and the cation exchange resin membrane support which delays or modulates the reduction in alkalinity.

July 20, 1971
R. E. STAUFFER
T888,011
RECEIVING SHEET FOR PHOTOGRAPHIC
DIFFUSION TRANSFER PROCESS
Filed Nov. 19, 1970
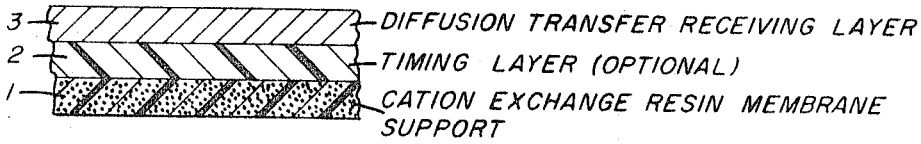
ROBERT E. STAUFFER
INVENTOR.
BY Henry E Byers
ATTORNEY